(12) United States Patent
Withers

(10) Patent No.: US 8,419,223 B2
(45) Date of Patent: Apr. 16, 2013

(54) LED TUBE TO REPLACE FLUORESCENT TUBE

(76) Inventor: Billy V. Withers, Homedale, ID (US)

( * ) Notice: Subject to any disclaimer, the term of this patent is extended or adjusted under 35 U.S.C. 154(b) by 401 days.

(21) Appl. No.: 12/766,449

(22) Filed: Apr. 23, 2010

(65) Prior Publication Data

US 2010/0270925 A1  Oct. 28, 2010

Related U.S. Application Data

(60) Provisional application No. 61/172,049, filed on Apr. 23, 2009, provisional application No. 61/305,330, filed on Feb. 17, 2010.

(51) Int. Cl.
*F21V 29/00* (2006.01)

(52) U.S. Cl.
USPC ............................. 362/294; 362/254

(58) Field of Classification Search .................. None
See application file for complete search history.

(56) References Cited

U.S. PATENT DOCUMENTS

| | | | |
|---|---|---|---|
| 6,068,686 A | 5/2000 | Sorensen | |
| 6,109,764 A * | 8/2000 | Shu | 362/653 |
| 6,158,882 A | 12/2000 | Bischoff, Jr. | |
| 6,472,823 B2 * | 10/2002 | Yen | 315/112 |
| 6,583,550 B2 | 6/2003 | Iwasa | |
| 6,739,734 B1 | 5/2004 | Hulgan | |
| 6,762,562 B2 | 7/2004 | Leong | |
| 6,853,151 B2 | 2/2005 | Leong | |
| 6,860,628 B2 | 3/2005 | Robertson | |
| 6,871,981 B2 * | 3/2005 | Alexanderson et al. | 362/294 |
| 6,936,968 B2 | 8/2005 | Cross | |
| 7,049,761 B2 | 5/2006 | Timmermans | |
| 7,053,557 B2 | 5/2006 | Cross | |
| 7,067,992 B2 | 6/2006 | Leong | |
| 7,114,830 B2 | 10/2006 | Robertson | |
| 7,249,865 B2 | 7/2007 | Robertson | |
| 7,307,391 B2 | 12/2007 | Shan | |
| 2006/0126338 A1 * | 6/2006 | Mighetto | 362/294 |

OTHER PUBLICATIONS

English Translation JP Utility Model 3119578, published Feb. 8, 2006.*
Quasar Light co., Ltd.; T5 LED Light Tube for Cabinet Lighting; http://renatec.en.made-in-china.com/product. Accessed Jun. 14, 2010.
Quasar Light Co., Ltd. T8 LED Fluorescent Tube Lights for Replacement; http://renatec.en.made-in-china.com/product. Accessed Jun. 14, 2010.
Shenzhen Kingint Lighting Technology Co., Ltd.; LED Tube; http://kingint8889.en.made-in-china.com/product. Accessed Jun. 14, 2010.
Shenzhen HK Light Ltd., LED Fluorescent Tube Light; http://hklight.en.made-in-china.com/product. Accessed Jun. 14, 2010.

* cited by examiner

*Primary Examiner* — Mary Ellen Bowman
(74) *Attorney, Agent, or Firm* — Robert L. Shaver; Dykas & Shaver

(57) ABSTRACT

Presented is an LED light tube in the general configuration of a prior art fluorescent tube. The LED light tube includes end caps with electrodes at each end, with the electrodes providing physical mounting structure to mount the LED light tube in an existing LED light fixture. The end caps of the LED light tube are not electrically active, but merely provide physical mounting structure to mount the LED light bulb in an existing fluorescent light fixture. This allows existing LED light fixtures to be utilized without replacement, by merely replacing the tubes and ballast with LED based equipment.

15 Claims, 4 Drawing Sheets

LED TUBE TO REPLACE FLUORESCENT TUBE

CLAIM OF PRIORITY

This application claims the benefit of U.S. Provisional Application No. 61/172,049, filed Apr. 23, 2009, the disclosure of which is incorporated by reference. This application also claims the benefit of U.S. Provisional Application No. 61/305,330, filed Feb. 17, 2010, the disclosure of which is incorporated by reference.

BACKGROUND

Fluorescent light fixtures have been a popular form of lighting for many decades. A fluorescent lighting fixture includes one or more fluorescent tubes, with each tube having an end cap on each end of a generally cylindrical glass tube. Within the tube is confined a mixture of gases which cause a coating on the inside of the tube to fluoresce when power is conducted through the gas from one end of the tube to the other. The end caps of the fluorescent tubes fit into an electrical connection on each end, with a tombstone type connection being a typical example. Other types of connections are also possible but all would have end caps with electrodes at the end which connect to a power source.

The typical fluorescent fixture also includes a box or luminary in which the tubes are enclosed, and typically a reflector or diffusion plate of some type or both. A typical diffusion plate may be a panel of plastic with diamond or pyramid shape projections on one surface of the plastic. This helps to spread the light from the fluorescent tubes into a wide area in a room. The luminaries are typically a metal box which is mounted in a false ceiling of a room, so that the diffuser plate which forms one side of the luminary is flush with the ceiling. Obviously there are a huge variety of other types of fluorescent fixtures, but this is a description of a very common type.

Lighting systems based on LED light sources are a fairly new technology in the lighting field. LED's are desirable because they have an extremely long life, and they use far less power than fluorescent tubes of equivalent output. However, the installed base of fluorescent light fixtures is huge, and removing every fluorescent light fixture would be an incredible expense. What is needed is an LED light which replaces the fluorescent tubes in a typical fluorescent luminary, which does not require replacement of the luminary itself or other components of the fluorescent light fixture.

SUMMARY

The invention is an LED lighting tube configured to replace any fluorescent lighting tube, such as a T-8, T12, or T5 fluorescent tube, in a fluorescent tube fixture. Obviously, there are many types of fluorescent lights and this invention would work with any of them. The lighting tube of the invention includes a tube body which has a long axis and a form similar to typical fluorescent tubes. At one end of the tube body is a first dummy end cap and at the other end is a second dummy end cap. The dummy end caps have electrode pins, and are proportioned so that they fit in a standard fluorescent light fixture, but they are electrically non-active.

Attached to the tube body is a heat sink base plate, which is attached to the first and the second dummy end caps. The heat sink base plate has a first and a second side. A number of LED light sources are attached to the heat sink base plate on the first side of the base plate, and are generally directed away from the first side of the base plate. They can also be pointed at an angle or various angles away from the first side of the base plate.

Mounted to the base plate, and positioned above the LED light sources, is a diffuser plate. The diffuser plate is held in place by a number of support posts.

The device also includes a light driver for supplying power to the LED light sources. The light driver is electrically connected to the LED light sources by power leads which are attached to the heat sink base at an attachment point between the two dummy end caps.

The light tube cover would typically be of a transparent material such as plastic or glass or an equivalent material. It could be formed as a generally cylindrical tube body, and be similar in configuration to cylindrical fluorescent tubes. The lighting tube could also be generally U-shaped in cross section and have an open side running the length of the tube body. The base plate is preferably made of aluminum, and generally rectangular in shape. The aluminum is a good material for the heat sink properties of the base plate.

The diffuser plate is generally translucent, and may be frosted or have ridges, scales, or other surface features to enhance diffusion of light. A dimmer switch may be used with the LED light tube of the invention, for adjusting the brightness of the LED light sources. The electrical connection from the power source to the LED's of the invention enters the tube not through the electrodes on the end of the tubes, but through a position on the side of the tube or the side of the end caps. The electrodes are present on the ends of the tube merely to provide a physical mounting structure to allow the LED tube to be mounted in mounting connections for conventional fluorescent lighting.

The device of the invention may also have a diffuser back plate which is attached to the base plate, and can serve as a heat radiator. It is semi-circular in cross section, joined to the base plate at its edges, and can have fins or ridges to assist in dissipation of heat from the LED lights.

The invention can include an end cap for use on an LED lighting tube, with the end cap including an electrical connection molded into the side of the end cap. In this version of the device, one of the end caps has electrical contacts molded into the end cap, with the electrical contacts on the side of the end cap, and with the pins of the dummy end cap being electrically non-active, to be used only for securing the light tube in a convention fluorescent fixture. The electrical connections from the light driver would be connected to the side of the end cap. By molding the electrical connections from the light driver into the end cap, the electrical connections can be made less expensively than building them into the base plate and going through the diffuser plate to access them.

DESCRIPTIONS OF THE DRAWINGS

PREFERRED EMBODIMENT

Figure 1:
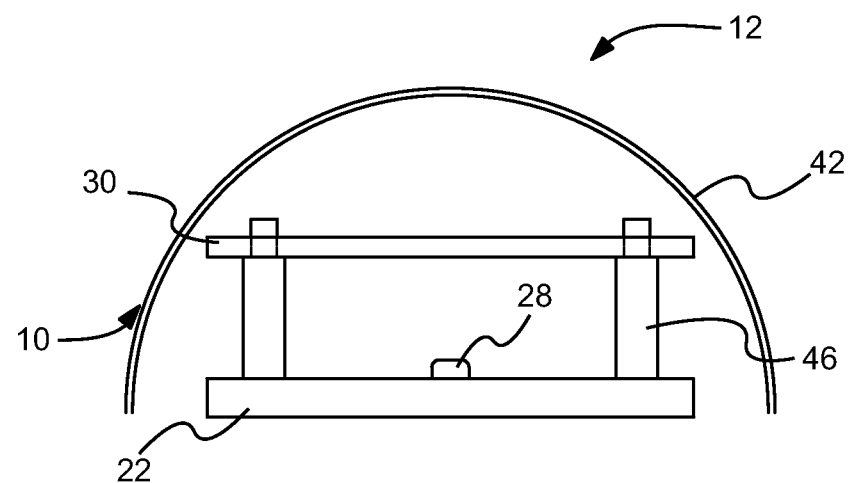
FIG. 1 is a side cross sectional view of the LED light tube of the invention.
Figure 2:
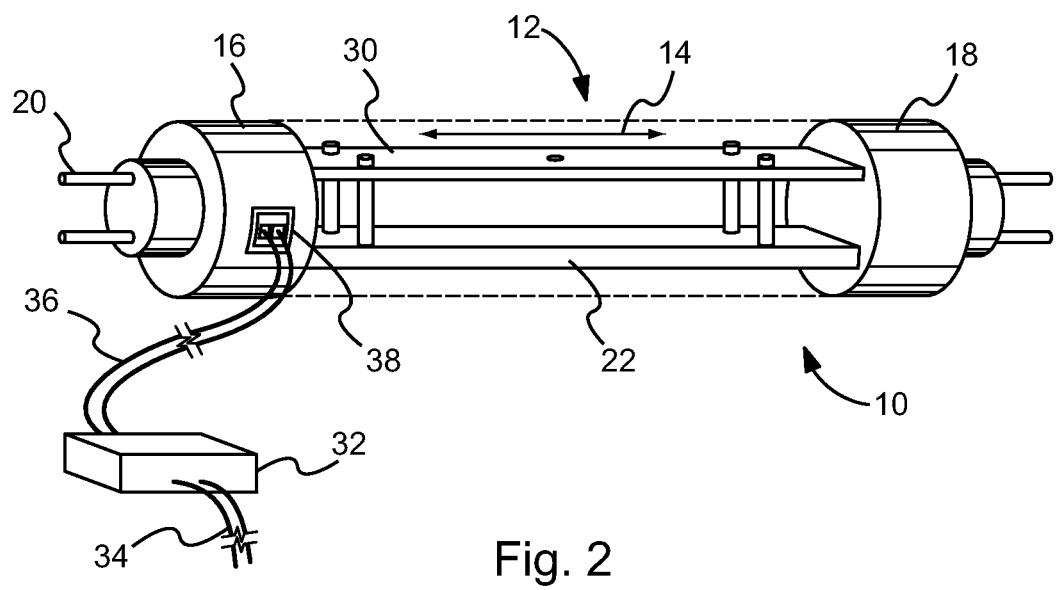
FIG. 2 is a perspective view of the LED light tube of the invention, with the cover glass removed.

Several preferred embodiments of the LED lighting tube are shown in FIGS. 1-5. FIG. 1 shows a version of the lighting tube in which the LED light tube is designated as 10. The LED light tube includes a tube body 12 which includes a long axis 14 which is shown in FIG. 2. The LED light tube of FIG. 1 includes a heat sink base plate 22, a diffusion plate 30, LED light sources 28, and support posts 46. FIG. 2 shows a first end cap 16 and a second end cap 18 of the light tube, and the heat sink base plate 22 and the diffusion plate 30, but with the cover 42 removed.

LED lights which may be utilized with this device can be of various types such as SMD, DIP, as well as any other type of LED light. The lights may be positioned on the heat sink base plate 22 in a variety of patterns including side by side in pairs, or staggered and in a number of configurations. For instance, 330 LED bulbs is one configuration which utilizes approximately 17 to 18 watts of energy and is approximately equivalent to a 40 watt fluorescent tube. An array of 276 LED bulbs uses approximately 15 to 17 watts of power, and is roughly equivalent to a 32 watt fluorescent tube.

The light tube has a dimmable light driver, which would be dimmable at the light switch. The LED light is powered by an external power source which includes a connection to line voltage 34 which is routed to the light driver 32, and with the light driver 32 attached to the light tube of the invention by power leads 36. The LED lights may be powered in a number of DC voltages including 6, 12, 24, 36, and 48 volts, depending on the application. The light tube includes electrodes 20 which are physically identical to the electrodes of the fluorescent tube which the LED light tube replaces, but they are not electrically connected to the electronics of the tube. They are merely there for physically connecting the LED lighting tube 10 with the fluorescent light fixture, and specifically with the tombstone or other light connections that are used with the fluorescent light structure.

The heat sink base plate 22 will be sized to fit the dimensions of the fluorescent tube which it replaces, and therefore one version will be approximately 3 centimeters by 44 centimeters. This length would be suitable for T8 fluorescent tube lights, and other sizes would be suitable for other sizes of fluorescent tubes lights and fixtures.

The heat sink base plate may be made from polycarbonate/polymer, or may be an aluminum alloy for superior absorption of heat from the LED lights.

The color of the LED's will be various throughout the spectrum and may be designed to meet the requirements of the specific application. Likewise the amount of light output by the LED light tube of the invention will be variable and designed to meet a specific application. The cover 42 may be semi-circular, u-shaped, or may be a tubular cover with a generally circular cross section. The cover 42 may be made of glass, polycarbonate, mixed polymers, or other materials with a suitable transparency for lighting fixtures.

Figure 3:
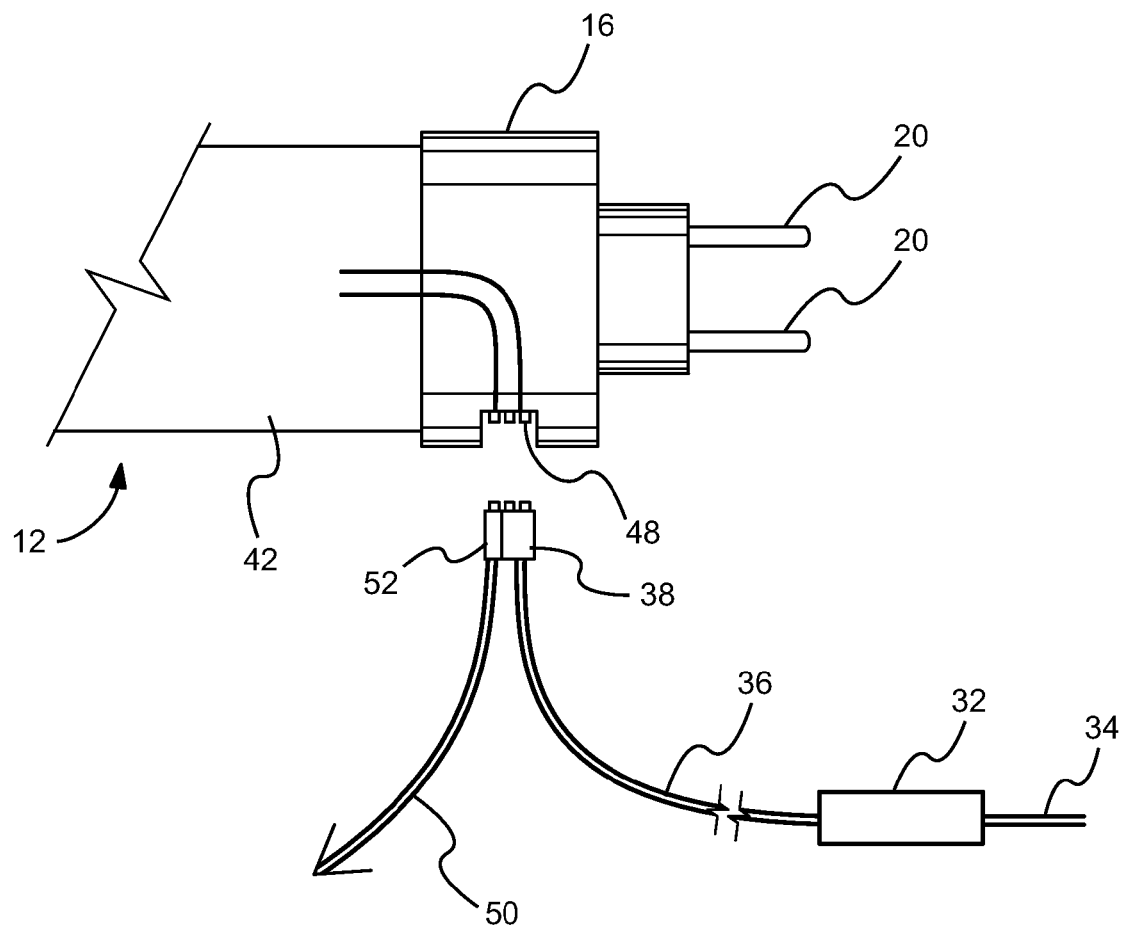
FIG. 3 is a top view of one end cap of the invention.

FIG. 3 shows one preferred embodiment of the invention. FIG. 3 includes a tube body 12 with a cover 42. Shown is an end cap 16 with electrodes 20. Also shown is a connection to line voltage 34 to a light driver 32 which is connected by power leads 36 to the low voltage power input connection 38. This is inserted into a power receptacle 48 which is located in the end cap 16. The power receptacle 48 is constructed so that the low voltage power input connection 38 can only be inserted in a specified orientation, so that the polarity of the power leads 36 cannot be reversed. From the power receptacle 48, the power wires 50 are distributed to the LED light sources 28. In addition to the low voltage power input connection, the design shown in FIG. 3 includes an output connection 52. The output connection 52 allows an LED light tube adjacent to the one shown in FIG. 3 to be electrically connected by power lines 50 to the light driver 32. In this way two or more adjacent LED light tubes 10 may be connected to each other in a daisy chain fashion.

The advantage of having the power receptacle 48 build into the end cap 16 is that in this way the electrical connection can be made in a molding process, which is an efficient way to wire the device for providing power to the LED light sources.

Figure 4:
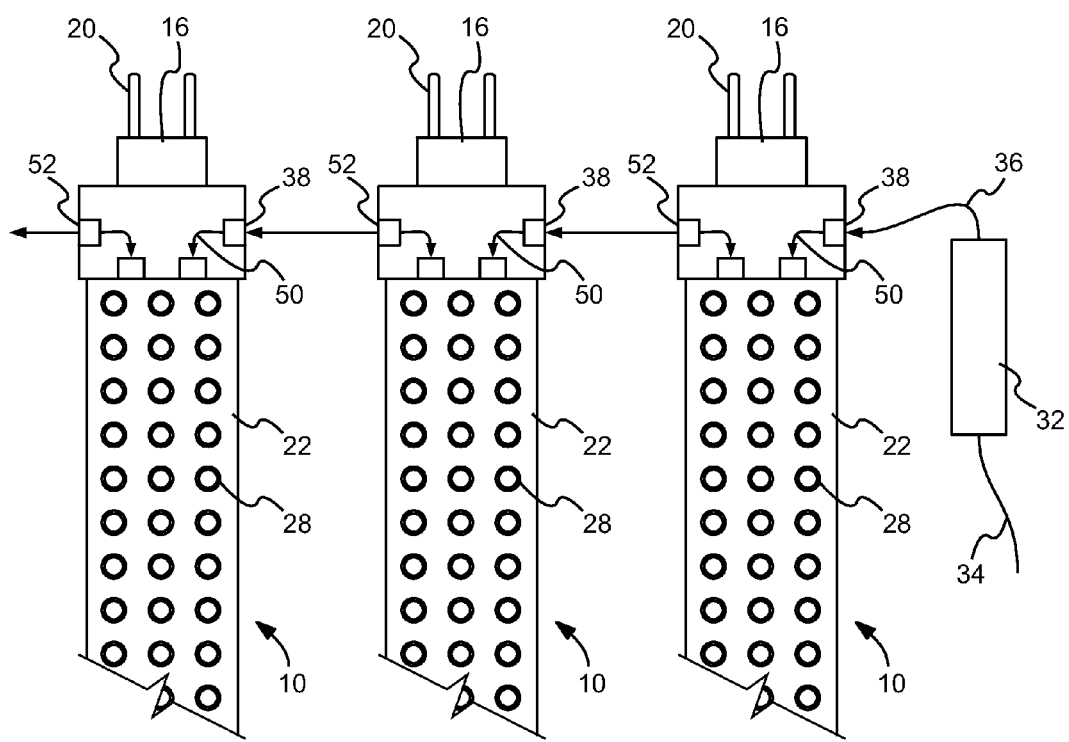
FIG. 4 is a schematic view of several of the LED light tubes of the invention connected to each other.

FIG. 4 shows a version of the LED light tube of the invention in which three light tubes are connected to each other using the output connection of one end cap 16 to connect to the input connection 38 of an adjacent LED light tube. Shown attached to the end cap 16 are the heat sink base plates 22 on which are mounted a number of LED light sources 28.

Figure 5:
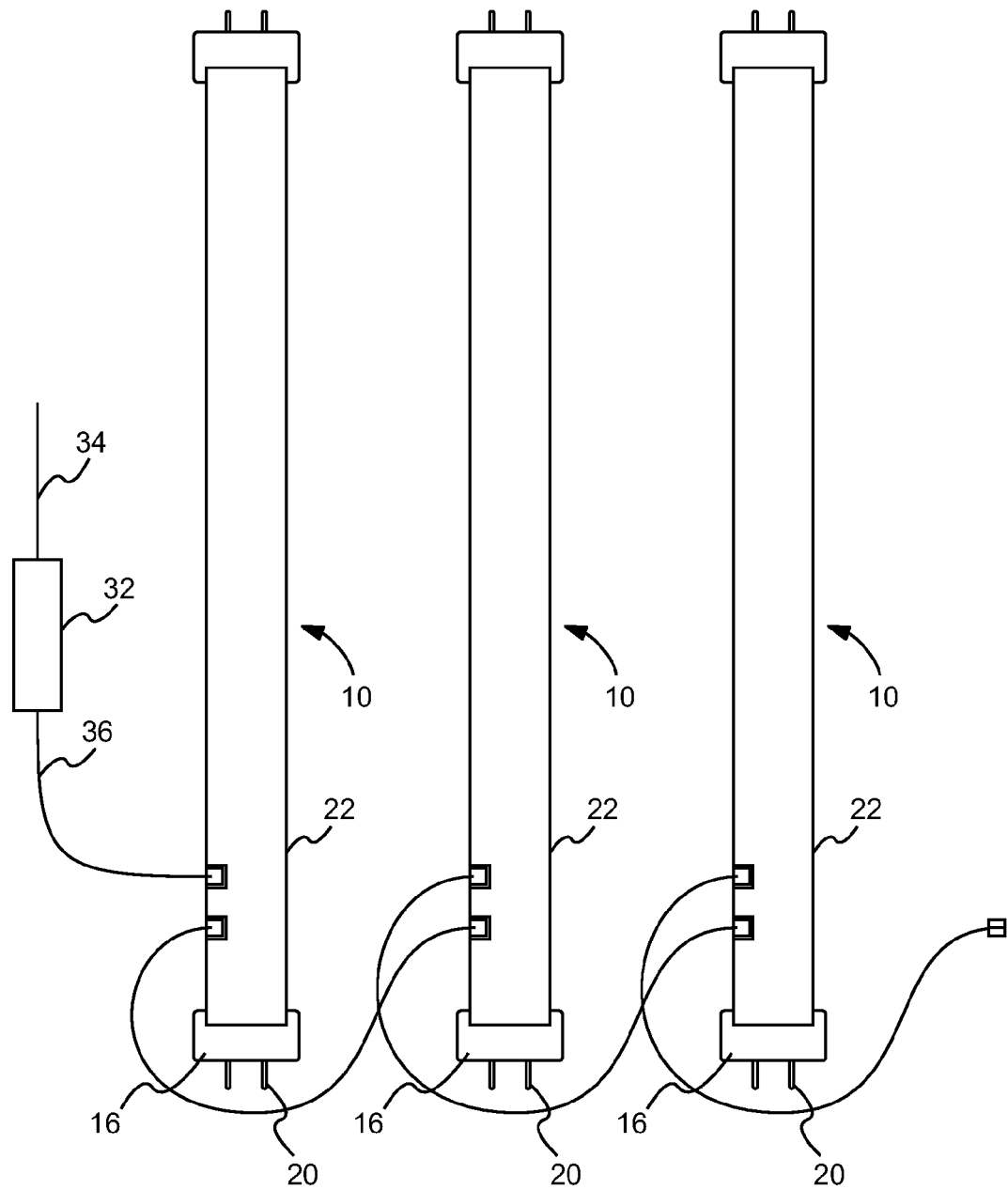
FIG. 5 is a top view of an alternative version of the light tube of the invention.

FIG. 5 is a view of the light tube of the invention in which the power input to the light tubes 10 enters the tube at the side, rather than at the end caps. In this configuration, the electrodes are still not electrically active, but are present for mounting the light tube to the lighting fixture. The tubes of FIG. 5 are chained together so that one light source powers multiple light tubes.

I claim:

1. An LED lighting tube for placement in a fluorescent light fixture, comprising:
    a tube body with a long axis, comprising a first dummy end cap and a second dummy end cap, with each end cap having two protruding electrodes configured for engagement with said fluorescent light fixture, with said electrodes configured for physically mounting said tube body, and being electrically unconnected to electrical components of said LED lighting tube;
    a heat sink base plate positioned within said tube body and attached to said first and second dummy end caps, with said heat sink base having a first and a second side;
    a plurality of LED light sources attached to said heat sink base plate and oriented on said first side of said heat sink base plate, and directed generally away from said first side of said base plate;
    a diffuser plate attached to said heat sink base plate, and held in a spaced apart relationship with said heat sink base plate, and positioned between said LED light sources and said tube body;
    a light cover extending between said end caps and covering said heat sink base plate, said light sources, and said diffuser plate;
    a recessed low voltage power input connection in a side of one of said dummy end caps, for connection to a light driver;
    said light driver for supplying power low voltage power to said LED light sources, with said light driver comprising a connection to line voltage, and power leads which attach to said recessed low voltage power input connection, with said low voltage power input connection positioned between said end cap electrodes, but not electrically connected to said end cap electrodes.

2. The LED lighting tube of claim 1 in which said tube body is of a generally transparent material.

3. The LED lighting tube of claim 1 in which said tube body is generally cylindrical.

4. The LED lighting tube of claim 1 in which said tube body is generally "U" shaped in cross section.

5. The LED lighting tube of claim 1 in which said heat sink base plate is an aluminum and generally rectangular in shape.

6. The LED lighting tube of claim 1 in which said diffuser plate is generally translucent.

7. The LED lighting tube of claim 1 in which said diffuser plate is attached to said base plate, and held apart from said base plate by a plurality of support posts.

8. The LED lighting tube of claim 1 which further comprises a dimmer switch for adjusting the brightness of said LED light sources.

9. The LED lighting tube of claim 1 in which said LED lighting tube is designed to operate at a plurality of DC voltages.

10. The LED lighting tube of claim 1 in which said LED lighting tube further comprises a power output plug recessed and molded into one of said dummy end caps, for providing power to adjacent LED lighting tubes via daisy-chain connections.

11. The LED lighting tube of claim 1 in which said Low voltage power input plug on heat sink base is designed to allow connection with power cable only with correct polarity when inserted in plug.

12. LED Lighting tube of claim 1 which further comprises a built-in circuit device which limits currents.

13. An LED lighting tube for placement in a light fixture, comprising:
- a tube body with a long axis, comprising a first dummy end cap and a second dummy end cap, with each end cap having two protruding electrodes configured for engagement with said light fixture, with said electrodes configured for physically mounting said tube body, and being electrically unconnected to electrical components of said LED lighting tube;
- a heat sink base plate positioned within said tube body and attached to said first and second dummy end caps, with said heat sink base having a first and a second side, with a recessed low voltage power input connection molded into a side of one of said dummy end caps, for connection to a light driver, and with a recessed low voltage power output connection molded into a side of one of said dummy end caps, for providing power to a neighboring lighting tube;
- a plurality of LED light sources attached to said heat sink base plate and oriented on said first side of said base plate, and directed generally away from said first side of said base plate;
- a diffuser plate attached to said base plate, and held in a spaced apart relationship with said base plate, and positioned between said LED light sources and said tube body;
- a cylindrical light cover extending between said end caps and covering said heat sink base plate, said light sources, and said diffuser plate;
- a light driver for supplying a light driver for supplying power low voltage power to said LED light sources, with said light driver comprising a connection to line voltage, and power leads which attach to a low voltage power input connection molded into said first and second end caps, but not electrically connected to said end cap electrodes.

14. The LED lighting tube of claim 1 in which said Low voltage power input plug on heat sink base is designed to allow connection with power cable only with correct polarity when inserted in plug.

15. The LED lighting tube of claim 12 which includes a tube body lower half of aluminum which serves as heat sink and radiator, and is generally semicircular in cross section.

* * * * *